Sept. 22, 1936.  E. H. WHEELER  2,055,422

INDEXING STATION TYPE MACHINE

Filed Oct. 14, 1934

INVENTOR
*Earl H. Wheeler*
BY
*Mitchell Bechert*
ATTORNEYS.

Patented Sept. 22, 1936

2,055,422

UNITED STATES PATENT OFFICE 2,055,422

INDEXING STATION TYPE MACHINE

Earl H. Wheeler, Detroit, Mich., assignor, by mesne assignments, to The New Britain Machine Company, New Britain, Conn., a corporation of Connecticut Application October 11, 1934, Serial No. 747,809

4 Claims. (Cl. 29—50)

My invention relates to an indexible station type machine and more particularly to an indexible spindle carrier or turret and its supports.

The invention is an improvement on certain features of the machine disclosed in Gridley et al. application, Serial No. 551,136, filed July 16, 1931. In said application a bar machine and chucking machine are disclosed. Such machine involves an indexible spindle carrier which is locked in bearing supporting engagement with the frame between indexing movements thereof and during indexing movements the spindle carrier is raised and supported by rollers so that during indexing the spindle carrier is out of bearing supporting engagement with the frame.

It is the principal object of my invention to improve certain features of the supporting means for the indexible member of a machine of the character indicated, and more specifically it is an object to provide means which, while not substantially increasing the frictional forces set up during indexing, avoids peening, brinelling, or substantial wear of the spindle carrier.

In the drawing which shows, for illustrative purposes only, a preferred form of the invention—

Figure 1:
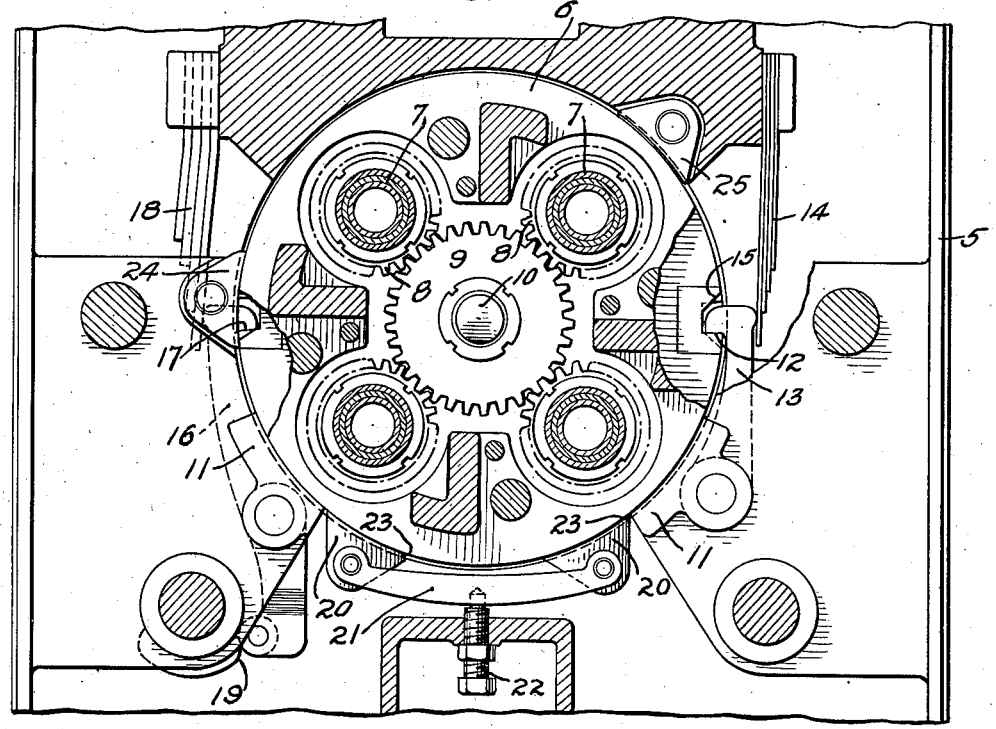
Fig. 1 is a transverse sectional view through the spindle carrier end of a multiple spindle bar or chucking machine and illustrating features of the invention.
Figure 2:
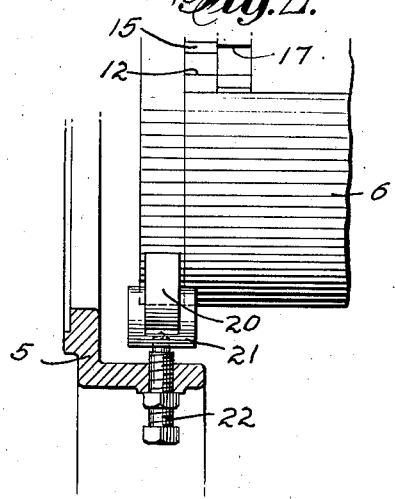
Fig. 2 is a fragmentary view in side elevation of a spindle carrier and supporting means therefor, parts being shown in section.

In said drawing, and as is more particularly set forth in said Gridley et al. application, 5 indicates generally the frame of the machine, while 6 indicates an indexible spindle carrier. The spindle carrier is indexed step by step by any suitable means not shown herein but more specifically disclosed in said application. The spindle carrier, as illustrated, carries four spindles 7—7, which spindles carry pinions 8, all of which may be rotated by means of a central spur gear 9 carried on the shaft 10 which is driven through suitable spindle drive gear mechanism.

The spindle carrier between indexing movements is definitely held or locked in bearing supporting engagement with the frame. In the form shown, the frame is provided with supporting means preferably in the form of a plurality of supporting abutments 11—11 which are accurately formed to support the spindle carrier 6 in the desired position. The spindle carrier is provided with locking slots, the corresponding side 12 of each slot being substantially radial to be engaged by the radially extending surface on the pivoted locking arm 13. The locking arm 13 may be urged inwardly as by means of a spring 14. When the turret indexes (clockwise as illustrated), the locking arm 13 is cammed out by the cam surface 15 of the locking slot engaging the rounded nose of the locking arm 13. At the side opposite the locking arm 13 is a second pivoted locking arm 16 having a nose with a cam surface 17 thereon for engagement with a correspondingly shaped cam surface in a second locking slot opposite the first mentioned locking slot. The nose of the locking lever 16 is urged inwardly as by means of a heavy plate spring 18 and may be moved outwardly, that is, to unlocking position, by means of a cam 19 engaging with the cam roll on the bottom of the locking lever 16.

Before the spindle carrier is indexed, the cam 19 withdraws the nose of the locking lever 16 and when the spindle carrier is indexed the nose of the lever 13 is cammed out of its locking slot and thereafter rides on the surface of the spindle carrier until in the next indexed position the nose of the lever 13 drops into its slot and the cam 19 then releases the locking lever 16, which, due to the cam surface 17, cams the spindle carrier down into bearing supporting engagement with the frame, such as the supports 11—11.

In order to avoid wear on the frame supports 11—11, the spindle carrier is moved out of bearing supporting engagement therewith during indexing movements. The spindle carrier is supported during indexing by slide shoe means, which, in the specific form shown, comprises two slide shoes 20—20 of sufficient extent and bearing to adequately support the spindle carrier. The slide shoes are moved to raise the spindle carrier and as shown may be carried on a spring saddle 21, the stress or tension of which may be adjusted as by means of an adjusting screw 22 in a part of the frame. Thus, upon proper adjustment of the screw 22 and release of the locking arms, the spring saddle 21 will urge the shoes 20—20 upwardly and raise the spindle carrier out of bearing supporting engagement with the frame supports 11—11. While so supported, the spindle carrier is indexed, and after it has been indexed the locking arms again move the spindle carrier down into bearing supporting engagement with the frame supports 11—11. During such forcing down of the spindle carrier, the spring saddle 21 simply yields and permits such downward movement of the spindle carrier. Since during indexing the spindle carrier is held out of bearing supporting engagement with the frame, and the frame supports 11—11 at no time act as indexing bearings for the spindle carrier and act only as supports, the latter are never subjected to wear incident to the indexing of the spindle carrier. Any wear which may take place during indexing would be on the shoes 20—20 and to a lesser extent on that portion of the spindle carrier bearing on such shoes. That part of the spindle carrier engaging the frame supports 11—11 need not be the same as the part engaging the shoes 20—20. If the spindle carrier indexes clockwise as shown, the forward edge of each shoe is preferably tapered off, as indicated at 23, so as to assist in getting lubricant in between the bearing faces of the shoe and spindle carrier.

It has been found that, with slide shoe means instead of rollers or other similar devices, there is little or no wear on the spindle carrier and that the surface of the spindle carrier is not peened or brinelled and withal such slide shoes have proven highly satisfactory in a device of the character indicated.

It is preferred in addition to the supporting shoes 20—20 to provide other means, such as a shoe 24, which may be similar to the shoes already described and positioned about opposite the locking arm 13. A shoe 24, positioned as shown, will resist movement of the spindle carrier toward the left as urged by the spring 14 and locking arm 13 riding on the surface of the spindle carrier during indexing. Other means, such as a shoe 25, may be provided to limit the rise of the spindle carrier under the influence of the shoes 20—20 and spring saddle 21. It is to be noted that the spindle carrier need be raised no definite distance except that it should be raised a distance sufficient at all times to clear the frame supports 11—11. A few thousandths of an inch clearance between the supports 11—11 and the spindle carrier during indexing is sufficient.

While the invention has been described in considerable detail, it is to be understood that changes, modifications, and variations may be made within the scope of the invention as defined in the appended claims.

I claim:

1. In a device of the character indicated, an indexible member, means having a slide bearing surface and support bearing surface for said indexible member, said indexible member and support bearing surface being movable relatively to each other in a direction transverse to the axis of indexing of said indexible member into and out of bearing supporting engagement with each other, whereby said indexible member may be slidably supported during indexing by said slide bearing surface and be out of bearing supporting engagement with said support bearing surface for the purpose described.

2. In a machine of the character indicated, a frame, an indexible member indexible about a horizontal axis, said frame having frame supports for said indexible member, means for urging said supports and indexible member into bearing supporting engagement with each other between indexing movements of said carrier, and slide bearing means engageable beneath said carrier and having a substantial area of contact with said carrier for slidably supporting said carrier out of bearing supporting engagement with said frame supports during indexing movements of said carrier.

3. In a device of the character indicated, an indexible member, fixed supporting means for supporting said carrier in a direction transverse to the axis of indexing, means for locking said carrier in bearing supporting engagement with said fixed supporting means between indexing movements of said carrier, a shoe to slidably engage beneath a part of said carrier, said carrier and shoe having substantial coacting bearing surfaces, and means for raising said shoe to slidably support said carrier out of bearing supporting engagement with said fixed supporting means during indexing movements of said carrier.

4. In a machine tool, a spindle carrier indexible about a horizontal axis, fixed supporting means for engaging beneath and supporting said spindle carrier between indexing movements of said carrier, a slide shoe having a substantial bearing surface engageable beneath and conforming in shape to a part of said spindle carrier, and means for raising said shoe to lift said spindle carrier free of said fixed supporting means and to slidably so support the carrier during indexing movements thereof.

EARL H. WHEELER.